US005934580A

United States Patent [19]

Maier et al.

[11] Patent Number: 5,934,580

[45] **Date of Patent: *Aug. 10, 1999**

[54] DOCUMENT SHREDDER

[75] Inventors: Franz Maier, Bermating; Helmuth Maier, Überlingen; Bruno Lang, Bermantingen, all of Germany

[73] Assignee: Schleicher & Co. International, Markdorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/814,404

[22] Filed: Mar. 11, 1997

[30] Foreign Application Priority Data

Mar. 14, 1996 [DE] Germany ........................... 196 10 048

[51] Int. Cl.[6] ..................................................... B02C 18/16

[52] U.S. Cl. ........................... 241/100; 241/166; 241/236

[58] Field of Search .................................... 241/236, 166, 241/167, 100

[56] References Cited

U.S. PATENT DOCUMENTS

| | | | |
|---|---|---|---|
| 4,119,277 | 10/1978 | Snyder et al. | 241/167 |
| 4,627,581 | 12/1986 | Holiman et al. | 241/167 |
| 4,809,916 | 3/1989 | Schwelling | 241/166 |
| 5,295,633 | 3/1994 | Kimbro et al. | 241/166 |

FOREIGN PATENT DOCUMENTS

| | | | |
|---|---|---|---|
| 260636 | 9/1987 | European Pat. Off. . | |
| 0 502 355 | 2/1992 | European Pat. Off. . | |
| 525491 | 2/1993 | European Pat. Off. . | |
| 1289404 | 10/1969 | Germany . | |
| 2249251 | 9/1973 | Germany . | |
| 1511166 | 10/1973 | Germany . | |
| 27 49 482 | 1/1986 | Germany . | |
| 23 38 654 | 4/1986 | Germany . | |
| 3631363 | 3/1988 | Germany . | |
| 37 06 862 | 9/1988 | Germany . | |
| 36 31 362 | 6/1989 | Germany . | |
| 40 03 222 | 4/1991 | Germany . | |
| 40 08 654 | 9/1991 | Germany . | |
| 41 09 467 | 9/1992 | Germany . | |
| 9310828 | 10/1993 | Germany . | |
| 43 39 336 | 9/1994 | Germany . | |
| 44 08 470 | 9/1994 | Germany . | |
| 9413845 | 10/1994 | Germany . | |
| 4342938 | 1/1995 | Germany . | |
| 44 36 751 | 4/1996 | Germany . | |
| 680907 | 8/1979 | U.S.S.R. | 241/167 |
| 2226778 | 7/1990 | United Kingdom | 241/166 |

*Primary Examiner*—Mark Rosenbaum
*Attorney, Agent, or Firm*—Quarles & Brady LLP

[57] ABSTRACT

A document shredder (11) has a cutting mechanism (12) constructed as a chassis and in which the cutting rollers (16) are mounted so as to contrarotate. They are designed as disks cutting on both sides for particle cutting. Over the entire length of the cutting rollers (16) extend stripper elements (28, 29), whose individual strippers (31) are combined into a block by means of longitudinally directed connecting elements (33). As they engage by more than 180°, almost 270°, around the shaft cross-section (18), two stripper elements (28, 29) are connected in mutually fitting manner in the circumferential direction. The stripper elements can be made in one piece from injection moulded plastic and are also used for the connection of the two side walls (14, 15) of the cutting mechanism (12).

14 Claims, 3 Drawing Sheets

DOCUMENT SHREDDER

TECHNICAL FIELD

The invention relates to a document shredder having a cutting mechanism, which has cutting rollers with interengaging cutting disks, in whose gaps engage strippers, which are connected to axially succeeding strippers.

DESCRIPTION OF THE BACKGROUND ART

Such a document shredder is known from DE 40 08 654 A1, where only a small part of the strippers enveloping the cutting roller circumference are manufactured in one piece from plastic with the casing base and casing top. As this document relates to a cutting mechanism with torsional cut, i.e. with cutting disks, whose flanks act in shear-like manner, the stripping problem is not very great, because the cut strips are rotated in helical manner and consequently of their own accord come free from the cutting gap.

In addition, one-piece stripping webs are known, which are constructed as cohesive sheet metal plates, in which are punched longitudinal slits, through which project the cutting disks. The webs between them act as strippers (cf. DE 1 289 404 B and DE 1 511 166 B). DE 40 03 222 C relates to a similar construction, but then the plastic webs are manufactured in one piece with the casing top or bottom.

In the case of document shredders constructed for particle cut, but also with strip cutters, a good stripping or cleaning of the slots between the cutting disks is important. This can best be brought about by strippers, which run relatively close to the bottom of the slots between the cutting disk, i.e. on the cutter spindle and engage round the same over a relatively large angle. Hitherto they have been individually punched from metal sheeting and individually arranged on staybolts linking the chassis optionally accompanied by the interposing of shims (cf. DE 27 49 482 A, DE 37 06 862 A, DE 41 09 467 A and DE 44 36 751 A). These strippers operate in a very satisfactory manner, but are very complicated to manufacture and fit.

SUMMARY OF THE INVENTION

The problem of the invention is to provide a document shredder, in which very efficient strippers can be simply and inexpensively manufactured and fitted.

This problem is solved by the invention. Thus, although the strippers can be separate from the casing, they pass in one piece and in cohesive manner over a considerable proportion and preferably the entire length of the cutting rollers and are therefore constructed in the manner of a disk comb. Thus, they can be made as a single plastic moulding and can be guided by staybolts, which connect to a chassis two side walls carrying the bearings. With a corresponding construction, they can also replace the staybolts.

The strippers can embrace the cutting roller by more than 180° and have two circumferentially oppositely directed, sharp-edged and in particular acute-angled stripping edges cooperating with the shaft portions between the cutting disks. To permit easy insertion into the spaces between the cutting disks, each cutting roller can have at least two juxtaposed stripping units, which are connected in fitting manner and guide one another and preferably the individual strippers are centred relative to one another with e.g. wedge and slot-like engagement elements.

The longitudinal connections can be through, circumferentially curved webs, which are constructed as elongated shells partly surrounding the cutting rollers. As a result the stripping unit is given stability. Extensions of these longitudinal connections can form correspondingly shaped projections, which engage in corresponding openings in the transverse supports, in which are also provided the cutting roller bearings. Thus, the strippers are directly fixed to the transverse supports or bearing brackets belonging to the cutting mechanism chassis. However, the stripping units can also be used in the case of document shredders, which are constructed without chassis with a self-supporting casing. When reference is made in the present invention to document shredders, this also covers comminuting devices of all types, which can be used for flat materials, i.e. also for packing materials made from paper, cardboard or other materials, such as e.g. foils.

It has proved to be particularly advantageous if the strippers, at least adjacent to the exit side of the comminuted document, following onto the stripping edges provided there, have a portion extending significantly beyond the outer circumference of the cutting disks and behind it a free space, in which is set back the outer boundary of the strippers preferably to below the cutting disk circumference. The resulting space makes it possible for particles left behind e.g. in the tooth spaces of slotted cutting disks after moving past between the outwardly projecting "horns" which follow onto the stripping edges, to expand, so that at the end of the free space, when the strippers rise again over the cutting disk circumference they can be stripped. Thus, the stripper not only ensures the cleaning out of the spaces between the cutting disks, but also maintains free the teeth provided for particle cut and formed by spiral slots in the cutting disks and the circumference of the cutting disks, which generally have a V-shaped depression.

The stripping unit can also be used for retaining a sensor for cutting mechanism control. Thus, e.g. a photodiode means for a light barrier controlling the cutting mechanism can be fitted in protected and position-fixed manner to the relatively stable stripper.

By the stripper units together with the transverse supports, the cutting mechanism is blocked to a rigid chassis absorbing the significant cutting forces. In preferred manner the transverse supports can have receptacles for a standing foot or base preferably having a bow-shaped construction from bar material. Thus, the forces can be directly absorbed, without influencing the outer casing which, for external appearance reasons is made from optically, high-grade plastic and which can be correspondingly constructed specifically in accordance with its function and without any particular carrying characteristics. Parts of this casing can be supported on the stripping unit, particularly in the vicinity of the insertion slot. The latter is small and relatively wide. Through the supporting on the stripping units a deformation in this area is avoided.

It has been found that through the invention and in particular the wide enveloping of the cutting shaft and the sharp stripping edges having a limited spacing therefrom, the stripping action is so good that there is no need to adapt the strippers very accurately to the cutting disk width and therefore the slot in which they run. This also renders unnecessary the hitherto required axially directed "floating" arrangement of the strippers. It is therefore possible to make the thickness of the strippers much and preferably 20 to 40% less than that of the cutting disks. This also avoids problems caused by different tolerances or expansions of the cutting disks and the stripper block. The good adaptation of the strippers to the cutting roller and in particular the running of the stripping edges close to or on the slot bottom between the cutting disks, is rendered possible by the self-lubricating characteristics of the plastic injection moulding, without having to fear a ceasing up or excessive frictional resistance.

Thus, a document shredder is provided, which can have a cutting mechanism constructed as a chassis, where the cutting rollers are mounted in contrarotating manner. They are preferably designed as disks cutting on both sides for particle cutting purposes. Stripping elements extending over the entire length of the cutting rollers are provided and their individual stripping disks are combined into a block by means of longitudinally directed connecting elements. As they engage by more than 180° and in fact almost 270° around the shaft cross-section, for each cutting roller there are two stripping elements connected in circumferentially fitting manner. The stripping elements can be made in one piece from injection moulded plastic and are also used for the connection of the two side walls of the cutting mechanism.

These and further features can be gathered from the claims, description and drawings and the individual features, either individually or in the form of subcombinations, can be implemented in an embodiment of the invention and in other fields and can represent advantageous, independently protectable constructions for which protection is claimed here.

The dividing up of the application into individual sections, as well as the subtitles in no way restrict the general validity of the statements made thereunder.

BRIEF DESCRIPTION OF THE DRAWINGS

An embodiment of the invention is described in greater detail hereinafter relative to the drawings, wherein show.

DESCRIPTION OF EMBODIMENTS

Figure 1:
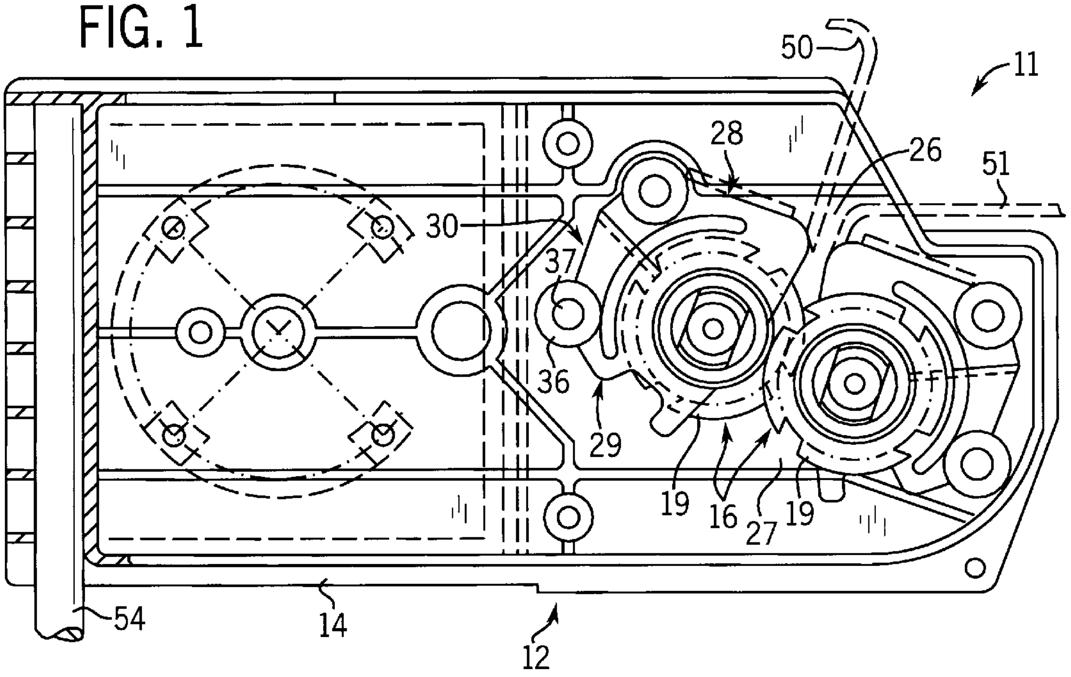
FIG. 1 A part sectional side view of a cutting mechanism for a document shredder with a removed side wall forming a transverse support.
Figure 2:
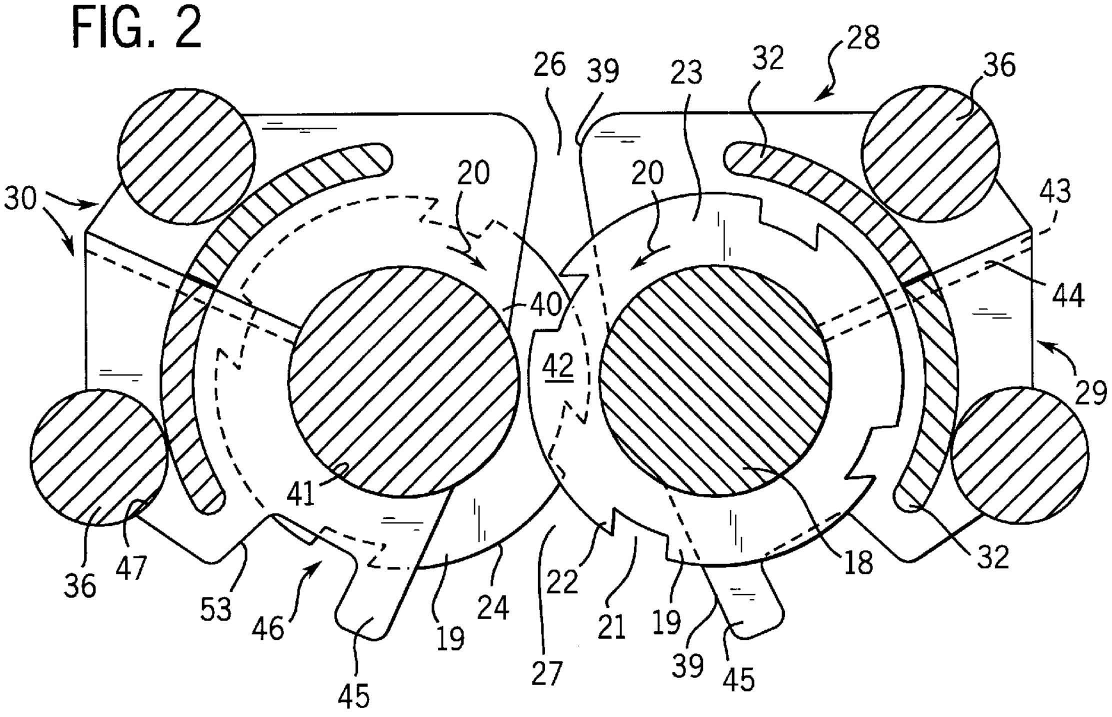
FIG. 2 A cross-section through the cutting rollers, stripper units and longitudinal supports (staybolts).

The core of a document shredder 11 is the cutting mechanism 12, which has a chassis construction. It contains two side walls or transverse supports 14, 15 (FIG. 4), whereof the transverse support 15 simultaneously contains a gearbox 17, in which the in FIG. 4 not shown gear wheels ensure a reduction of the driving speed emanating from a not shown electric motor to the working speed of the cutting rollers 16 (FIGS. 1 and 2).

The cutting rollers 16 are made in one piece from steel and have, starting from a through shaft cross-section 18, outwardly projecting cutting disks 19 with inclined slots leading in the rotation direction 20 therein or tooth spaces 21, which correspondingly form a forwardly directed cutting tooth 22. For details of the cutting disk construction and the action thereof reference is made to DE 22 47 901 B.

Between the individual cutting disk are provided circumferential slots 23, whose width is such that with a fit suitable for cutting between the circumferential edges of the cutting disks 19 they cooperate with the corresponding cutting disk of the other cutting roller. It can in particular be gathered from FIG. 2 that the cutting rollers engage in one another in such a way that each cutting roller with its circumference 24 cooperates with a relatively small spacing from the base 25 of the slot 23 of the facing cutting roller. The cutting disks are dimensioned in accordance with the desired particle dimensions, for example 4 mm wide and are provided on the circumference with a few, in the present example four slots or tooth spaces 21. In conjunction with the circumference 24 of the opposite cutting disk, these ensure that the strips cut by the circumferential edges of the cutting disks are cut or torn into individual particles. The cutting disks are driven synchronously, i.e. at the same speed and in contrarotating manner in the rotation direction 20, so that they engage the material in the vicinity of the entrance gap 26 and deliver the particles at the material exit 27.

With the cutting rollers 16 are associated stripper units 30 which, for each cutting roller 16, comprise two separately manufactured stripper elements 28, 29. They are manufactured as elongated elements in one piece from injection moulded plastic in the manner of a disk comb. Their strippers 31 constructed as flat segments or disks are interconnected by a longitudinal connection 32 passing over the entire stripper length. It is in the form of a ring shell segment surrounding in spaced manner the cutting disk circumference 24, which leads to a good rigidity with limited material expenditure. In the extension of said longitudinal connecting web 32 connecting elements 33 project to either side and are inserted in corresponding, crescent-shaped cutouts 34 on the two transverse supports 14, 15 (FIG. 4). By means of a shoulder 35 (FIG. 3) constructed as a step, the spacing of the transverse supports 14, 15 is also fixed. By corresponding connecting means, e.g. clamp connecting means, etc., the connecting elements can also be secured against tension in the transverse support.

However, in the present case, the longitudinal connection between the two transverse supports is ensured by four longitudinal supports 36, which in the manner of staybolts rigidly interconnect in the given spacing the transverse supports. It can be seen in FIG. 1 that this is brought about by screws screwed into tapped holes 37 of the longitudinal supports 36 and which are screwed in from the outside of the transverse supports.

Figure 3:
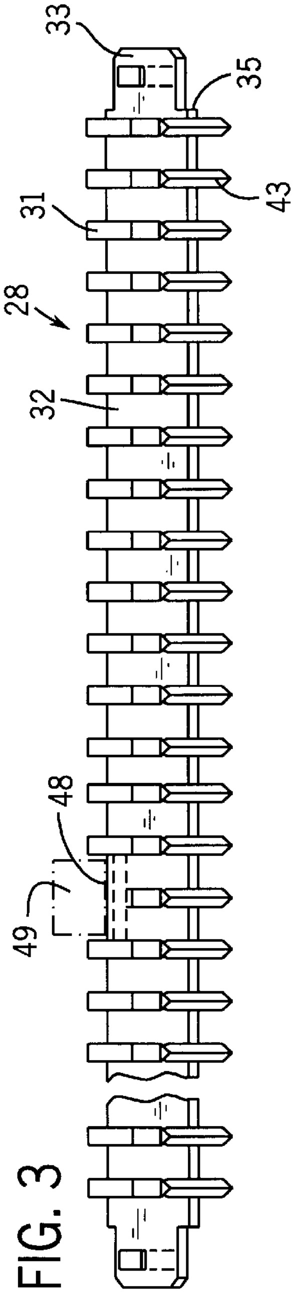
FIG. 3 A side view of a stripper unit.
Figure 5:
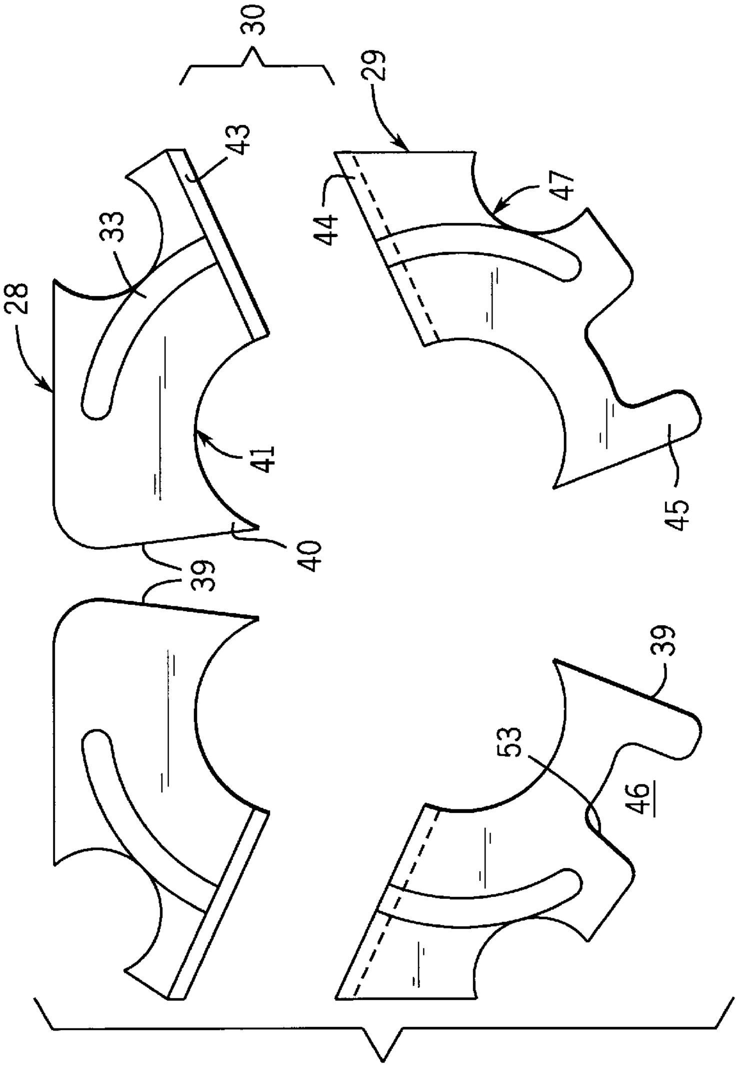
FIG. 5 The four stripper units belonging to a cutting mechanism in front view.
Figure 4:
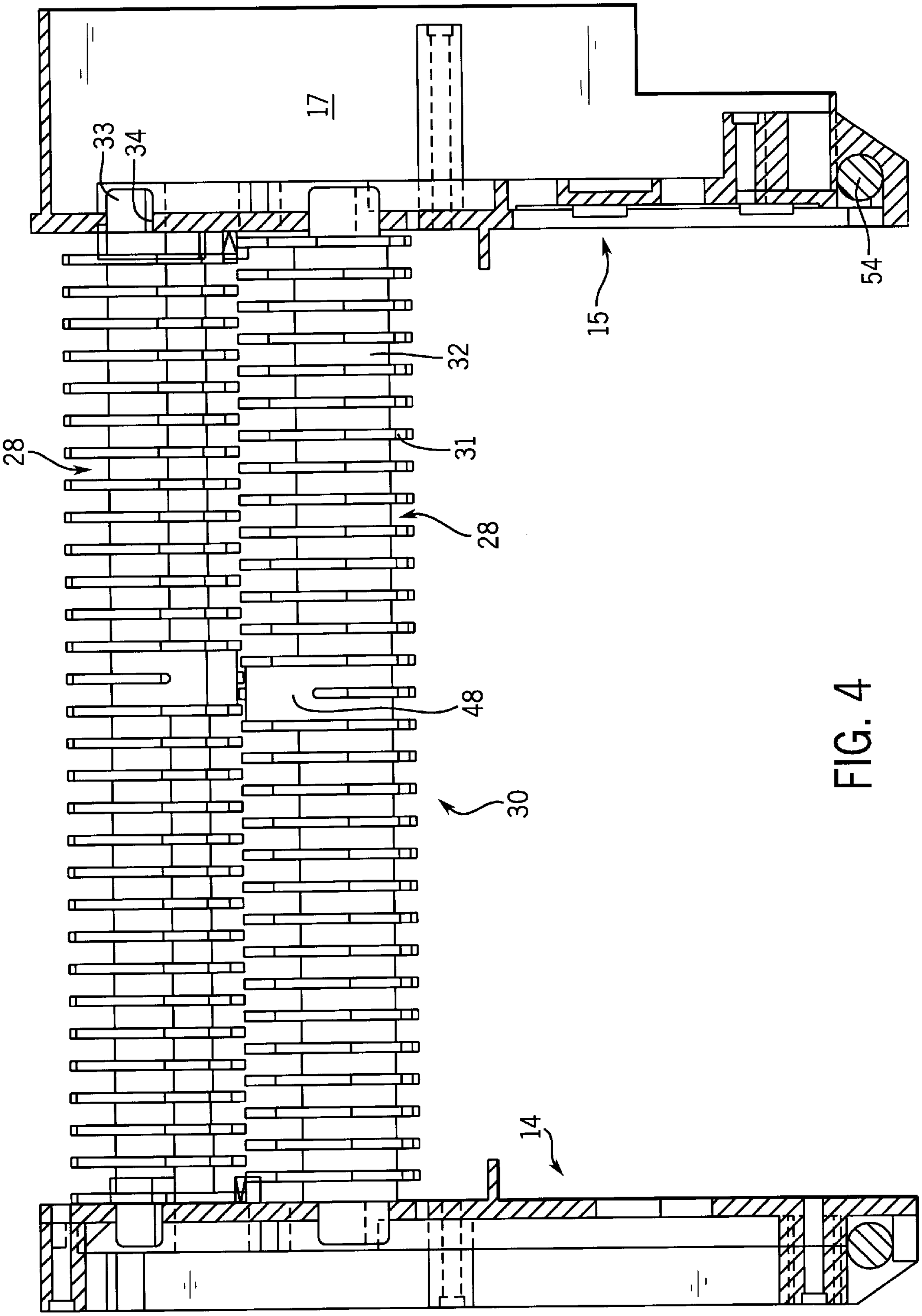
FIG. 4 The stripper units connected to the lateral transverse supports (side walls) in the fitted position (without cutting rollers and gear).

The form or shape of the strippers 31 can in particular be gathered from FIGS. 2 and 3, to which express reference is made in this connection. Although for each document shredder two stripper elements 28 and 29 are needed in each case, the inlet-side elements 28 and the outlet-side elements 29 can be identical for both sides and are fitted homologously to one another.

Figure 6:
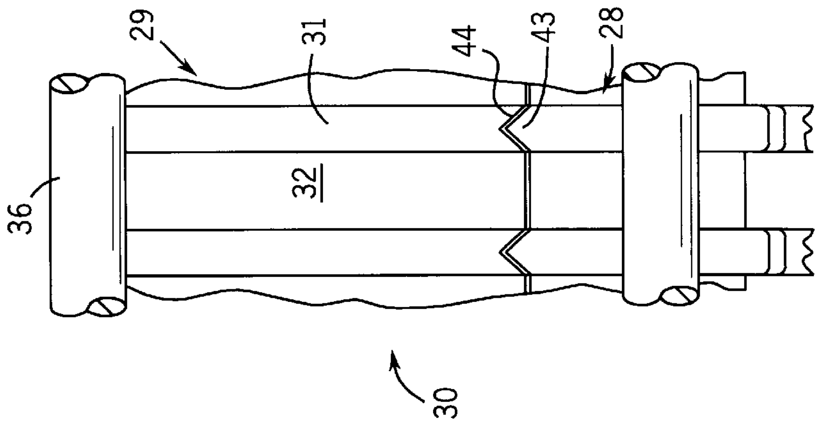
FIG. 6 A detail (in the direction of arrow VI in FIG. 2).

The two entrance-side stripper elements 28 close the relatively narrow entrance gap 26 between their facing edges 39. Adjacent thereto on the slot base 25 is provided a sharp, acute-angled stripping edge 40, to which is connected an arcuate portion 41 adapted to the shaft cross-section 18. On the part of the cutting rollers remote from the cutting gap 42, where the overlapping cutting disks 16 cooperate, is located a connecting portion 43, which in the present example is in the form of a V-shaped rib or spring 43 (FIG. 6).

It cooperates with a corresponding V-shaped recess 44 on the strippers 31 of the exit-side stripping elements 29 for the mutual fixing and centring of each stripper 31 on the adjacent stripper element.

The strippers 31 of the exit-near stripper element 29 also have a sharp-edged, acute-angled stripping edge 40 and following onto the same an edge 39 adjacent to the exit gap 27. These edges 39 are so arranged that they bound a wedge or funnel-shaped opening exit gap 27, whilst the entrance gap 26 is relatively narrow. Following onto the edge 39 is provided a horn 45 projecting well over the cutting disk circumference 24 and on it stripped particles can be slid along from the cutting disks until they drop downwards out of the cutting gap region.

Following onto said horn is formed a free space 46 in that the outer edge of the stripper is removed to within the circumference 24 of the cutting disk 19. The outer circumference then returns to the large spacing from the centre possessed by the horn.

For both stripper elements 28, 29 the longitudinal connections 32 are so linked with one another that they are interconnected via the V-connection 43, 44, so as to enclose roughly a ⅓ circle. The strippers combined from the two elements 28, 29 surround the cutting roller on the slot base 25 by more than 180, preferably close to 270°. Both stripper elements have in their strippers roughly ½ to ⅓ circle recesses 47, in which are located the longitudinal supports 36, which consequently fix and guide the stripper elements 28, 29.

Compared with the thickness of the cutting disk, the individual strippers 31 are relatively thin. FIGS. 3 and 4 shows that each cutting roller and therefore also each stripper element has roughly thirty juxtaposed strippers, which have a spacing with respect to one another of e.g. 8 mm, which leads to a cutting disk thickness of somewhat less than 4 mm. However, the actual strippers are only about 2.6 mm thick, i.e. about 35% narrower than the cutting disks or the circumferential slot 23 formed between them. Despite the resulting generous spacings, the stripping result is good, because the stripping edges 40 can run directly on the slot base 25 and therefore ensure a good stripping action.

FIGS. 3 and 4 also show that the upper stripping elements 28, which are mainly shown in these drawings, have in their centre a receptacle 48 for a sensor 49 of a cutting mechanism motor control, e.g. a light barrier. They can be snapped in there and are protected, being directly positioned on the entrance gap 26.

FIG. 1 shows that a not detailed represented casing can be supported with the casing portions 50, 51 (shown in dot-dash line form) bounding the entrance gap 26 on the outer boundary of the edge 39, so as to ensure a precise orientation of the small, wide insertion slot 26.

FIGS. 1 and 4 also show that receptacles 52 for a standing foot or base 54 are formed at the transverse support en d remote from the cutting rollers. Said base is also constructed as a downwardly extending bar material bow and its upper ends are received in the receptacle 52 in the form of a cylindrical means. Thus, the chassis of the cutting mechanism 12 stands directly on the bases and the forces acting on the document shredder 11 and which mainly emanate from the cutting mechanism, are directly absorbed by the base.

Function

The document shredder 11 function s as follows. Through the entrance gap 26 documents or other flat material are brought into the vicinity of the cutting gap 42. On switching on the apparatus, the sensor 49 generates a signal, which brings the not shown drive (motor and gear) into forward motion. The cutting rollers contrarotate in the rotation direction 20 and bring the document into the cutting gap. Between the cutting edges of the cutting disks strips are cut in accordance with the disk width and simultaneously through the cooperation of the cutting disks with the transverse slots 23 particles are separated, which drop downwards out of the exit gap 27 into a container located below the document shredder. If particles adhere in the slots 23 or on the slot base 25, they are stripped off by the strippers 31 and in particular the stripper edge 40, are transported by the virtually tangential arrangement of the edges and due to the cutting disk rotation in the outwards direction and are ejected downwards. Should particles adhere to the cutting disk circumference or more particularly adhering in the cutting disk slots 21 so as to be received between the horns 45, they can expand to the side in the vicinity of the following free spaces 46 and are then held back and ejected downwards by the following edge 53 of the stripper 31.

Should a stoppage occur, either by the automatic control or in manual manner the rotation direction of the cutting mechanism is reversed and therefore conveys upwards the document "lumps" which it has formed. The stripping edges 40 located at the entrance side 26 come into operation so as to ensure that the document particles in said rearwards rotation direction are not conveyed round the cutting rollers.

We claim:

1. A cutting mechanism for a document shredder, the document shredder also having a casing and the cutting mechanism comprising:

- a plurality of cutting rollers, each cutting roller being rotatable around a longitudinal axis of rotation and having a plurality of cutting disks spaced longitudinally along each respective roller; and
- a plurality of integrally formed stripper units positioned in said casing, each of said stripper units integrating a longitudinal connection element and a plurality of strippers, the plurality of strippers being spaced longitudinally along the longitudinal connection element to form longitudinally spaced gaps, and the stripper units being spaced from each other to form a cutting gap, with the cutting disks from each respective cutting roller being received in the respective longitudinal gaps of a respective stripper unit and with the cutting disks of respective cutting rollers engaging each other in the cutting gap, at least two of the stripper units embracing each respective cutting roller by more than 180°, wherein for each cutting roller there are at least two stripper units which are interconnected in a fitting manner around a portion of the circumference of each cutting roller and wherein the strippers of a first one of the two stripper units are mutually aligned and positioned with respect to the strippers on a second one of the two stripper units; and
- the stripper units being one-piece injection moulding plastic elements formed separately from the casing and extending between and being connectable to supports, in which bearings of the cutting rollers are received.

2. Document shredder according to claim 1, wherein the stripper units include two circumferentially oppositely directed, sharp-edged and acute-angled stripping edges leading towards a lower portion of the cutting gap formed between the cutting disks.

3. Document shredder according to claim 1, wherein the strippers of each stripper unit include respectively, wedge elements and wedge-receiving slot elements, which mate with each other to align and position the strippers with respect to each other.

4. Document shredder according to claim 1, wherein the stripper units have longitudinally directed recesses for partial reception and support on longitudinal supports of a cutting mechanism chassis.

5. Documents shredder according to claim 1, wherein the stripper units have at its end faces projections which engage in transverse supports holding bearings for the cutting rollers.

6. Documents shredder according to claim 5, wherein one of the transverse supports forms a gearbox.

7. Document shredder according to claim 5, wherein the transverse supports have receptacles for a bow-shaped standing foot for the document shredder.

8. Document shredder according to claim 1, wherein the cutting disks are constructed for particle cutting by having slots in the cutting disk circumference.

9. Document shredder according to claim 1, wherein portions of a casing enveloping the cutting mechanism are supported on at least one of the stripper units.

10. Document shredder according to claim 1, wherein the strippers of two adjacent and interengaging cutting rollers bound between them the cutting gap which has a narrow material insertion gap at an upper end and a much wider opening exit gap at a lower end.

11. Document shredder according to claim 1, wherein the thickness of the strippers is considerably smaller than that of the cutting disks.

12. A cutting mechanism for a document shredder, the document shredder also having a casing and the cutting mechanism comprising:

a plurality of cutting rollers, each cutting roller being rotatable around a longitudinal axis of rotation and having a plurality of cutting disks spaced longitudinally along each respective roller; and a plurality of integrated stripper units positioned in said casing, each of said stripper units integrating a longitudinal connection element and a plurality of strippers, the plurality of strippers being spaced longitudinally along the longitudinal connection element to form longitudinally spaced gaps, and the stripper units being spaced from each other to form a cutting gap, with the cutting disks from each respective cutting roller being received in the respective longitudinal gaps of a respective stripper unit and with the cutting disks of respective cutting rollers engaging each other in the cutting gap, and wherein the longitudinal connection elements are arcuately curved webs.

13. A cutting mechanism for a document shredder, the document shredder also having a casing and the cutting mechanism comprising:

a plurality of cutting rollers, each cutting roller being rotatable around a longitudinal axis of rotation and having a plurality of cutting disks spaced longitudinally along each respective roller;

a plurality of integrally formed stripper units positioned in said casing, each of said stripper units integrating a longitudinal connection element and a plurality of strippers, the plurality of strippers being spaced longitudinally along the longitudinal connection element to form longitudinally spaced gaps, and the stripper units being spaced from each other to form a cutting gap, with the cutting disks from each respective cutting roller being received in the respective longitudinal gaps of a respective stripper unit and with the cutting disks of respective cutting rollers engaging each other in the cutting gap, at least two of the stripper units embracing each respective cutting roller by more than 180°, wherein for each cutting roller there are at least two stripper units which are interconnected in a fitting manner around a portion of the circumference of each cutting roller and wherein the strippers of a first one of the two stripper units are mutually aligned and positioned with respect to the strippers on a second one of the two stripper units; and wherein the strippers have outer boundaries, comprising at least adjacent to an exit side for comminuted documents and following onto a stripping edge, a portion projecting significantly beyond an outer circumference of the cutting disk, and wherein the strippers have behind the projecting portion a space in which the stripper's outer boundaries have a radial distance from a roller central axis of rotation, which is smaller than the circumference of the cutting disk.

14. A cutting mechanism for a document shredder, the document shredder also having a casing and the cutting mechanism comprising:

a plurality of cutting rollers, each cutting roller being rotatable around a longitudinal axis of rotation and having a plurality of cutting disks spaced longitudinally along each respective roller;

a plurality of integrally formed stripper units positioned in said casing, each of said stripper units integrating a longitudinal connection element and a plurality of strippers, the plurality of strippers being spaced longitudinally along the longitudinal connection element to form longitudinally spaced gaps, and the stripper units being spaced from each other to form a cutting gap, with the cutting disks from each respective cutting roller being received in the respective longitudinal gaps of a respective stripper unit and with the cutting disks of respective cutting rollers engaging each other in the cutting gap, at least two of the stripper units embracing each respective cutting roller by more than 180°, wherein for each cutting roller there are at least two stripper units which are interconnected in a fitting manner around a portion of the circumference of each cutting roller and wherein the strippers of a first one of the two stripper units are mutually aligned and positioned with respect to the strippers on a second one of the two stripper units; and wherein the cutting mechanism has an entrance and an exit side for material to be shredded, and wherein a receptacle is positioned longitudinally along at least one of the stripper units and is snapped in position for holding a cutting mechanism control sensor.

* * * * *